(No Model.) 2 Sheets—Sheet 1.
E. TOUSSAINT.
FIELD GLASS.
No. 569,528. Patented Oct. 13, 1896.
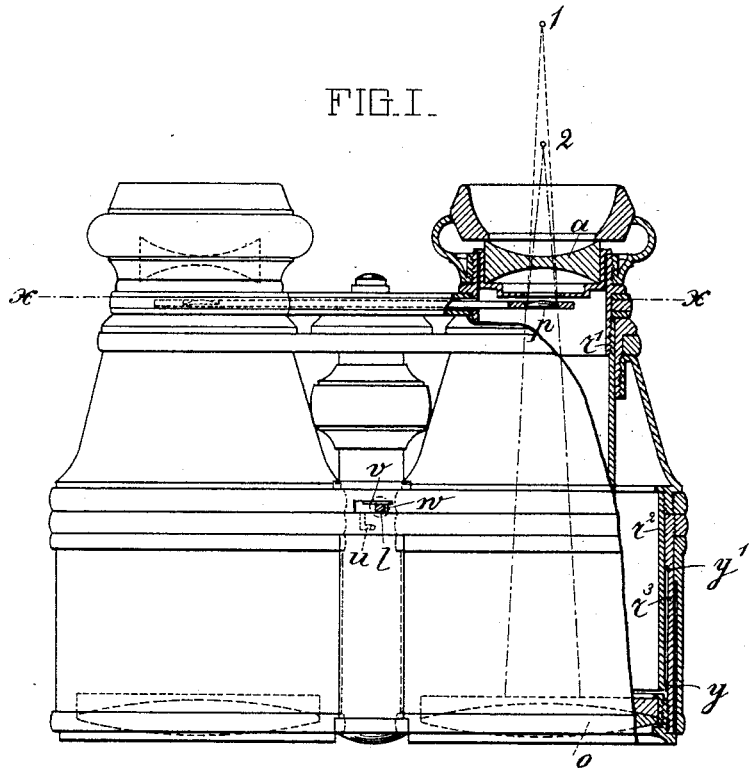
FIG. I.
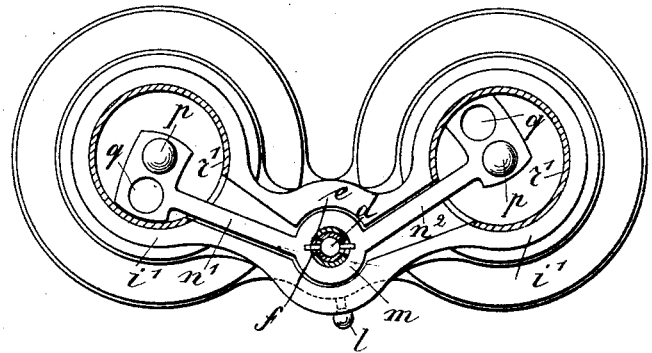
FIG. II.
Witnesses:
F. W. Wright.
Geo. C. Abb.
Inventor
Emile Toussaint
By Howson & Howson
his Attorneys (No Model.) 2 Sheets—Sheet 2.
E. TOUSSAINT.
FIELD GLASS.
No. 569,528. Patented Oct. 13, 1896.
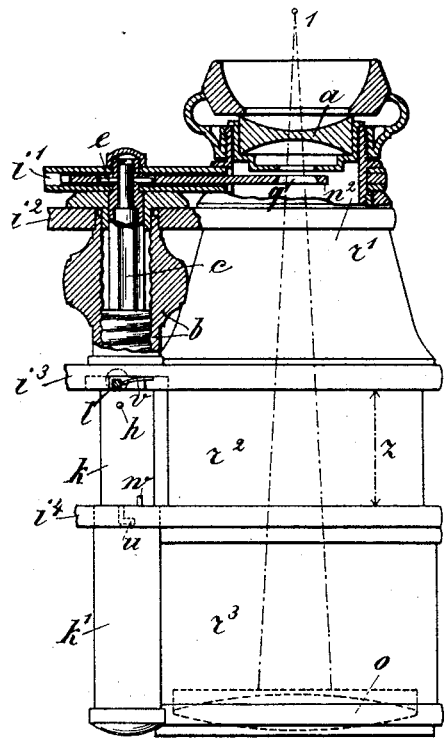
FIG. III.
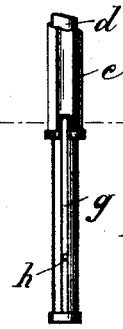
FIG. VI.
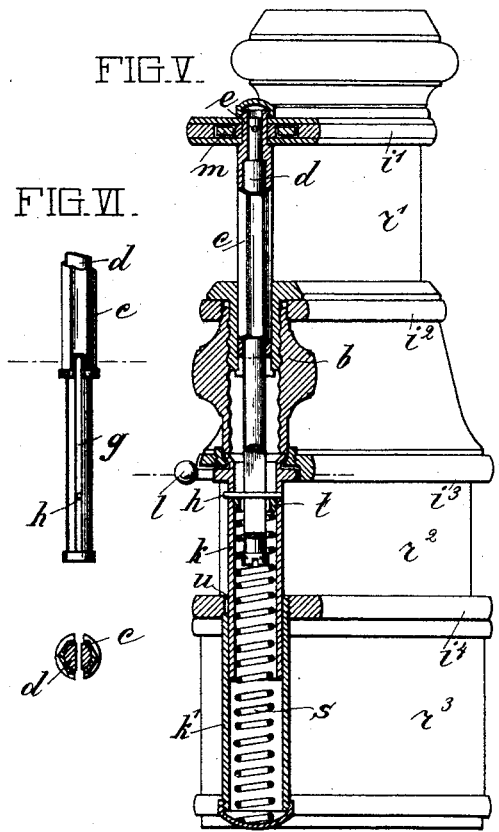
FIG. V.
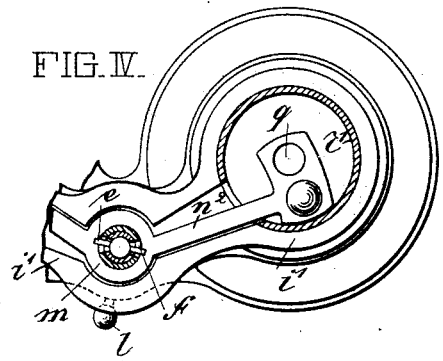
FIG. IV.
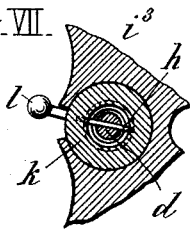
FIG. VII.
Witnesses:—
F. W. Wright
Geo. E. Abbe
Inventor
Emile Toussaint
By Howson & Howson
his Attorney

UNITED STATES PATENT OFFICE.

EMILE TOUSSAINT, OF BERLIN, GERMANY.

FIELD-GLASS.

SPECIFICATION forming part of Letters Patent No. 569,528, dated October 13, 1896.

Application filed June 5, 1896. Serial No. 594,433. (No model.)

*To all whom it may concern:*

Be it known that I, EMILE TOUSSAINT, a subject of the King of Prussia, Emperor of Germany, and a resident of Berlin, Germany, have invented certain new and useful Improvements in Field-Glasses, of which the following is a specification.

This invention has for its object an arrangement for suddenly increasing the degree of magnifying power without necessitating the glass being removed from the eyes in such field-glasses as are more particularly used for military observations, as well as by tourists and sportsmen. The arrangement consists in a convex glass being inserted ordinarily in front of each of the two oculars of the field-glass, so that the magnifying effect produced by the oculars is diminished and by a mechanism being arranged which, by means of one and the same grip of the hand, moves aside the convex glasses placed in front of the oculars and simultaneously pushes forward the objectives to an extent which equals the difference of the focal distance of the objective alone and the focal distance of the combination of the objective and the convex glass inserted in front of its respective ocular.

In the accompanying drawings, Figure 1 shows an elevation of the field-glass when shut up, one of the oculars being shown in section with the convex glass inserted in front of it. Fig. 2 is a horizontal section on the line $x\ x$ of Fig. 1. Fig. 3 shows one-half of the field-glass with the adjusting device when the convex glass is moved aside and the objectives pushed forward. Separate important parts are shown in section. Fig. 4 is a horizontal section of Fig. 3. Fig. 5 is a section of the whole adjusting mechanism. Figs. 6 and 7 are details.

$a$ are the oculars; $o$, the objectives.

$p$ are the convex glasses, which are moved in and out.

The screw of the set-screw $b$, connected with the framework or setting of the eye-glasses $a$, is mounted on a hexagonal sheath or holder $c$, Figs. 3, 5, and 6, the inner hollow space of which has a circular section. In this hollow space a round spindle $d$, Figs. 5 and 6, is mounted, which is connected with the sheath $c$ by means of a pin $e$ in such a way that it is displaced longitudinally, together with the latter, while short diametrical slots $f$, Figs. 2 and 4, in the sheath $c$ allow a small independent rotation of the spindle $d$. The latter is slotted from its lower end to a length corresponding to the maximum displacement of the ocular $a$, and through this slot $g$, Figs. 5 and 6, a pin $h$ projects, which pin, lying transversely, is attached to a tube $k$, revolubly mounted in the bridge $i^3$. This tube carries a knob $l$, Fig. 7. If the tube $k$ be turned by means of this knob $l$, it carries with it, by means of the pin, the spindle $d$ and also the pin $e$, attached to the latter. The two ends of this pin engage in the socket $m$ of a two-armed lever $n'\ n^2$, Fig. 2, revoluble on the upper rounded end of the hexagonal sheath or holder $c$, mounted on the bridge $i'$, and cause this lever $n'\ n^2$ to swing in one direction or the other, according to the direction of rotation of the handle. This two-armed lever $n'\ n^2$ oscillates within the bridge $i'$, Figs. 2 and 3, which is suitably hollowed out, and the lever projects with the flat widened ends of its two arms into the tubes $r'$, carrying the oculars.

Two apertures are formed in each of the flat or plate-like ends of this lever. In one of these apertures of each arm a convex glass $p$ is inserted, while the second aperture $q$ is free. The outward movement of the lever $n'\ n^2$ is limited by the ends of the plate-shaped extensions encountering the wall of the tube $r'$, and these plate-shaped extensions are so designed that when the lever is at one limit of its position the centers of the two convex glasses $p$ coincide with the center lines of the objectives and the oculars, Figs. 1 and 2, while in the second limit position of the lever these center lines pass through the center of the apertures $q$ before mentioned, Figs. 2 and 4.

Each objective $o$ is mounted in a tube $r^3$, which is screwed into the bridge $i^4$, Fig. 5, and is adjustable on a tube $r^2$, screwed to the bridge $i^3$. The bridge $i^4$ carries a tube $k'$, which adjusts itself on the tube $k$, revolubly mounted in the bridge $i^3$. The tube $k'$ is closed below. A spiral spring $s$ is arranged in the tubes $k$ and $k'$, the upper counter-stop of such spring being formed of a ring $t$, soldered or riveted firmly in the tube $k$.

The spring $s$ has a constant tendency to push forward the tube $k'$ and with it the bridge $i^4$ of the tube $r^3$ and the objective $o$. This movement is limited by the outwardly-bent front edge $y$ of the tube $r^2$ and by an inwardly-projecting projection $y'$ on the tube $r^3$.

The securing of the tube $r^3$ when the glass is shut up takes place by means of the pin $h$, one end of which projects from the tube $k$, which pin on the pushing in of the tube $r^3$ first enters into a groove $u$, Fig. 3, provided in the bridge $i^4$, and on the turning of the smaller lever or knob $l$, and therewith also of the tube $k$, is transferred into a horizontal branch of this groove $u$.

A flat spring $v$ is mounted on the bridge $i^3$ in the slot in which the knob $l$ may be moved to and fro, which spring prevents any turning back of the small lever or knob when it is in the position shown in Fig. 3. The objectives $o$ are then pushed out. If they are to be again pushed in, a pin $w$, attached to the bridge $i^4$, Fig. 3, pushes the spring $v$ back in such a way that the knob $l$ can be turned back again as far as up to the pin $w$.

The mode of using the field-glass hereinbefore described is as follows: Assuming that the objectives $o$ are in a pushed-in condition, and are secured in this position by means of the pin $h$, engaging in the groove $u$, by moving into a suitable position the knob $l$ the convex glasses $p$ are thrown into position. The field-glass is therefore in the condition shown in Fig. 1. In consequence of the refraction again produced by the convex glasses $p$ the focal distance of the objective, which of itself extends up to the point 1, Fig. 1, is limited or shortened to the point 2, and thereby the field of vision increased, but simultaneously also the absolute magnifying power diminished of itself. The oculars $a$ are adjusted to the eye by means of the set-screw $b$. If, then, any object in the field of vision is to be subjected to a more careful inspection, it is brought as far as possible into the center of the field of vision, and then by pressing the finger on the knob $l$, without removing the field-glass from the eye, the knob $l$ is turned into the position shown in Fig. 3, when the lever $n'$ $n^2$ makes, in the manner hereinbefore described, such a movement that the free apertures $q$ take the position of the convex glasses $p$, and simultaneously the fastening $h$ $u$ is released, that is to say, the compressed spring $s$ is released, and thus the objective $o$ is thrown forward. The extent $z$ of this forward throw, Fig. 3, is equal to the distance apart of the two focal distances 1 and 2, so that the field-glass then acting with full magnifying effect remains in focus with the eye and allows the object in question to be immediately inspected more distinctly.

Having now particularly described and ascertained the nature of the said invention and in what manner the same is to be performed, I declare that what I claim is—

1. In a field-glass with adjustable magnifying power, the combination with oculars $a$, of convex glasses $p$ placed in front of them and of a small lever or knob $l$, which simultaneously moves aside the said convex glasses $p$ and causes the objectives $o$ to be pushed out to an extent $z$ which equals the difference of the focal distances of the objective alone and of its combination with the convex glass $p$ inserted in front of the ocular, substantially as described.

2. In a field-glass of the kind described, the combination with objectives $o$ and means for securing the small lever or knob $l$, of a spring $s$ which pushes forward the objectives, and of a pin $w$ fixed in the bridge $i^4$ carrying the objective tube $r^3$, whereby the knob $l$ is again released, substantially as described.

In testimony whereof I have signed my name to this specification in the presence of two subscribing witnesses.

EMILE TOUSSAINT.

Witnesses:
 ERNST DILLAN,
 EMIL T. HOFFMANN.